United States Patent Office 3,374,083
Patented Mar. 19, 1968

3,374,083
METHOD FOR THE CONTROL OF UNDESIRABLE VEGETATION WITH 3,5,6-SUBSTITUTED URACILS
Harvey M. Loux, Hockessin, Del., assignor to E. I. du Pont de Nemours and Company, Wilmington, Del., a corporation of Delaware
No Drawing. Continuation-in-part of application Ser. No. 416,158, Dec. 4, 1964. This application Feb. 4, 1966, Ser. No. 525,107
The portion of the term of the patent subsequent to Feb. 15, 1983, has been disclaimed and dedicated to the public
2 Claims. (Cl. 71—92)

This application is a continuation-in-part of my copending application Ser. No 416,158, filed Dec. 4, 1964, which in turn is a continuation-in-part of the application Ser. No. 159,768, filed Dec. 15, 1961, both now abandoned.

This invention relates to the use of 3,5,6-substituted uracils as herbicides, and to certain of these uracils and their derivatives as new compounds.

More particularly, this invention is directed to compositions and methods employing, as an active herbicidal ingredient, at least one compound of the formula (1)

$$\begin{array}{c} \text{R}-\text{N} \overset{\text{O}}{\underset{\text{N}}{\bigcirc}} \text{R}_1 \\ \text{O}=\overset{|}{\underset{\text{H}}{\text{N}}} \text{R}_2 \end{array} \rightleftarrows \begin{array}{c} \text{R}-\text{N} \overset{\text{O}}{\underset{\text{N}}{\bigcirc}} \text{R}_1 \\ \text{HO}-\overset{|}{\underset{\text{N}}{}} \text{R}_2 \end{array}$$

where:

R is alkyl of 1 through 10 carbon atoms, substituted alkyl of 1 through 8 carbon atoms, aryl of 5 through 10 carbon atoms, substituted phenyl, aralkyl of 5 through 13 carbon atoms, substituted aralkyl of 5 through 13 carbon atoms, alkenyl of 3 through 8 carbon atoms, alkynyl of 3 through 8 carbon atoms, cycloalkyl of 3 through 12 carbon atoms, cycloalkenyl of 4 through 12 carbon atoms, cycloalkyl alkyl of 4 through 13 carbon atoms, cycloalkenyl alkyl of 5 through 13 carbon atoms, (substituted cycloalkyl)alkyl of 5 through 14 carbon atoms, and (substituted cycloalkenyl)alkyl of 5 through 14 carbon atoms;
$R_1$ is chlorine, fluorine, bromine, iodine, methyl, ethyl, propyl, butyl, methoxy, ethoxy, propoxy, butoxy, nitro, alkoxymethyl of 2 through 6 carbon atoms, hydroxy alkyl of 1 through 2 carbon atoms, alkylthio containing 1 through 4 carbon atoms, bromomethyl, fluoroethyl, or chloromethyl; or in the case where $R_2$ is a cycloalkyl radical containing 3 through 7 carbon atoms, $R_1$ may be hydrogen; and
$R_2$ is cycloalkyl of 3 through 7 carbon atoms, alkenyl of 3 through 5 carbon atoms, alkylthio of 1 through 4 carbon atoms, alkylthiomethyl of 2 through 3 carbon atoms or alkoxymethyl of 2 through 5 carbon atoms.

The salts of these compounds can also be used according to this invention. By "salts" is meant those compounds formed with such cations as sodium, potassium, lithium, calcium, magnesium, barium, strontium, iron, manganese and quaternary ammonium.

The uracils of Formula 1 also form novel 1:1 addition compounds with nitrogenous bases. The exact structure of these compounds is not known. Although the compounds are, generally speaking, poorly soluble in water, they are, according to the best available information, believed to be essentially salt-like in structure. They will be symbolized by the following formula, with the understanding that it is representative only, and is not intended to illustrate actual structure:

(2)

$$\left[ \begin{array}{c} \text{R}-\text{N} \overset{\text{O}}{\underset{\text{N}}{\bigcirc}} \text{R}_1 \\ \text{O}=\overset{|}{\underset{\text{H}}{\text{N}}} \text{R}_2 \end{array} \right] \cdot \text{NB}$$

where:

R, $R_1$ and $R_2$ are defined as in Formula 1, and
NB is a nitrogenous base having an ionization constant $K_b$ of $\geq 10^{-9}$ in water.

Suitable nitrogenous bases are substituted, unsubstituted, cyclic and acyclic amines, amidines, and guanidines. The amines can be primary, secondary or tertiary amines, polyamines, arylamines, or heterocyclicamines. Illustrative of such amines are:

sec-butylamine
2-amino-2-methyl-1,3-propanediol
trimethylenediamine
ethanolamine
dodecylamine
ethylenediamine
hexamethylenediamine
cocoadiamine
tallowdiamine
hexamethyleneimine
cyclohexylamine
methoxypropylamine
methylamine
dimethylamine
trimethylamine
ammonia
ethylamine
propylamine
butylamine
octylamine
pyridine
piperidine
tetramethylguanidine
acetamidine
benzylamine
diethylenediamine
2-aminobutanol-1
2-aminooctanol-1

The 3,5,6-substituted uracils of Formula 1 also form water stable, novel complexes with phenol and substituted phenols. These complexes have the formula (3)

$$\begin{array}{c} \text{R} \overset{\text{H}}{\underset{\text{O}}{\bigcirc}} \\ \overset{|}{\underset{\text{Y}_{m-1}}{\bigcirc}} \end{array} \left[ \begin{array}{c} \text{R}-\text{N} \overset{\text{O}}{\underset{\text{N}}{\bigcirc}} \text{R}_1 \\ \text{HO}-\overset{|}{\underset{\text{N}}{}} \text{R}_2 \end{array} \right]_n$$

where:

R, $R_1$ and $R_2$ are defined as in Formula 1,
X is hydrogen, chlorine, nitro, alkyl of 1 through 3 carbon atoms, bromine or $-OR_3$ where $R_3$ is alkyl of 1 through 3 carbon atoms,
Y is chlorine or alkyl of 1 through 3 carbon atoms,
m is a number 1 through 5, and
n is 1 or 2.

The amine addition compounds and phenol complexes of Formulate 2 and 3 above are novel compounds and provide formulation advantages such as increased water solubility and increased oil solubility over the uracils themselves. Their herbicidal effectiveness, however, is primarily due to their uracil content.

Preferred for use according to this invention are compounds of the formula (4)

$$\begin{array}{c} R'-N \overset{O}{\underset{O=}{\bigvee}} \overset{R_1'}{\underset{N}{\bigvee}} R_2' \\ H \end{array} \rightleftarrows \begin{array}{c} R'-N \overset{O}{\underset{HO-}{\bigvee}} \overset{R_1'}{\underset{N}{\bigvee}} R_2' \\ H \end{array}$$

where:

R' is alkyl of 2 through 8 carbon atoms, substituted alkyl of 2 through 8 carbon atoms, phenyl, substituted phenyl, aralkyl of 6 through 10 carbon atoms, substituted aralkyl of 6 through 10 carbon atoms, cycloalkyl of 3 through 8 carbon atoms, cycloalkenyl of 5 through 8 carbon atoms, cycloalkyl alkyl of 4 through 9 carbon atoms, or (substituted cycloalkyl)alkyl of 5 through 14 carbon atoms;

$R_1'$ is chlorine, bromine, iodine, methyl, hydroxymethyl, methoxymethyl or nitro; and $R_2'$ is alkoxymethyl of 2 through 3 carbon atoms, cycloalkyl of 3 through 6 carbon atoms or alkenyl of 3 through 4 carbon atoms.

In Formulae 1, 2, 3, and 4 the term "substituted alkyl" is intended to include such radicals as bromoalkyl of 1 through 10 carbon atoms,
chloroalkyl of 1 through 10 carbon atoms,
hydroxyalkyl of 1 through 8 carbon atoms,
alkoxyalkyl of 2 through 8 carbon atoms,
alkoxy carbonyl alkyl of 3 through 8 carbon atoms, and
cyanoalkyl of 2 through 8 carbon atoms.

Similarly, the terms "aryl" and "substituted phenyl" embrace radicals such as phenyl
furyl
naphthyl
o-biphenyl
pyridyl,
chlorophenyl,
bromophenyl,
alkoxyphenyl,
dibromophenyl,
fluorophenyl,
trichlorophenyl,
alkylphenyl of 7 through 11 carbon atoms,
dialkylphenyl of 8 through 12 carbon atoms,
chloroalkylphenyl of 7 through 10 carbon atoms,
nitrochlorophenyl,
nitrophenyl,
dichloronitrophenyl,
chloroalkoxyphenyl of 7 through 11 carbon atoms,
trifluoromethylphenyl,
tetrahydronaphthyl, and
indenyl.

The terms "aralkyl" and "substituted aralkyl" are intended to include such radicals as furfuryl,
benzyl,
phenylalkyl of 8 through 11 carbon atoms (total),
chlorobenzyl,
dichlorobenzyl,
alkylbenzyl of 8 through 11 carbon atoms (total),
dialkylbenzyl of 9 through 13 carbon atoms (total),
nitrobenzyl,
alkoxybenzyl of 8 through 11 carbon atoms (total), and
naphthylmethyl.

The terms "cycloalkyl," "cycloalkenyl," "cycloalkyl alkyl," and "cycloalkenyl alkyl" will include cyclohexyl,
cyclohexenyl,
cyclohexylalkyl,
cyclohexenylalkyl,
cyclopentyl,
cyclopentenyl,
cyclopentylalkyl,
cyclopentenylalkyl,
norbornyl,
norbornenyl,
norbornylalkyl,
norbornenylalkyl,
bicyclo(2,2,2)octyl,
bicyclo(2,2,2)octenyl,
bicyclo(2,2,2)octylalkyl,
bicyclo(2,2,2)octenylalkyl,
cyclopropyl,
cyclobutyl,
cyclobutylalkyl,
cyclobutenyl,
cyclobutenylakyl,
hexahydroindanyl,
tetrahydroindanyl,
hexahydroindenyl,
hexahydroindenyl alkyl,
tetrahydroindanyl alkyl,
hexahydroindanyl alkyl,
hexahydro-4,7-methanoindenyl,
tetrahydro-4,7-methanoindanyl,
hexahydro-4,7-methanoindanyl,
hexahydro-4,7-methanoindenyl alkyl,
tetrahydro-4,7-methanoindanyl alkyl,
hexahydro-4,7-methanoindanyl alkyl,
decahydronaphthyl,
decahydronaphthyl alkyl,
tetrahydronaphthyl,
tetrahydronaphthyl alkyl,
decahydro-1,4-methanonaphthyl,
decahydro-1,4-methanonaphthyl alkyl,
octahydro-1,4-methanonaphthyl,
octahydro-1,4-methanonaphthyl alkyl,
decahydro-1,4,5,8-dimethanonaphthyl,
decahydro-1,4,5,8-dimethanonaphthyl alkyl,
octahydro-1,4,5,8-dimethanonaphthyl, and
octahydro-1,4,5,8-dimethanonaphthyl alkyl.

These cyclic substituents can be further substituted with alkyl groups of 1 through 4 carbon atoms, methoxy, chlorine and bromine.

In the process of combining the various 3,5,6-substituents described above for R, $R_1$, and $R_2$, it is surprising to find that strikingly similar herbicidal activity can be obtained with seemingly unrelated substituents. On the other hand, it is equally surprising to find useful selective phytotoxicity (applicable in certain crop areas) when a relatively minor structural modification for R (for example a normal alkyl chain altered to a branched chain) is made. Each 5-substituent (described for $R_1$ above) for example, has a maximum and minimum range of herbicidal effectiveness and/or specie selectivity dependent on the nature of the substituent in the 3- or 6-position. There is little continuity of herbicidal effect which can be ascribed to a particular substituent independently of the other two substituents in the 3,5,6-positions.

UTILITY

These uracils represent a new weapon in the arsenal of farmers and property-owners in their battle against undesirable vegetation. These compounds are unique in that they exert their action against both broadleaf and grass weeds, are effective against hard-to-kill nutsedge and perennial grasses such as quack grass, Johnson grass, and Bermuda grass, and are effective on highly adsorptive substrates such as railroad ballast, heavy clay soil, and soils high in organic matter.

This combination of properties makes these compounds useful wherever general weed control is required, such as industrial areas, railroad, rights-of-way, and areas adjacent to croplands in agricultural areas.

Certain of the uracils also exhibit selective herbicidal action in crops. By properly selecting a uracil of the invention and a rate and time of application, annual grass and broadleaf seedlings in such crops as asparagus, corn, flax, sugar cane, pineapple, safflower, peanuts, citrus, alfalfa, strawberries, gladiolus, stone fruits and cucurbits can be controlled.

By proper selection of rate and time of application, certain of the uracils can also be used to control weeds growing in dormant crops.

This selective activity and activity on weeds growing in dormant crops is described in more detail in the examples.

The precise amounts of uracils to be used in any given situation will, of course, vary according to the particular end result desired, the use involved, the plant and soil involved, the formulation used, the mode of application, prevailing weather conditions, foliage density and like factors. Since so many variables play a role, it is not possible to indicate a rate of application suitable for all situations. Broadly speaking, the compounds are used at levels of about ¼ pound per acre to about 25 pounds per acre. For selective weed control in crops, rates of ¼ to 8 pounds per acre will generally be used. More of the active material can be used to control difficult-to-kill species growing under adverse conditions. Economic factors, such as inaccessibility of the area to be treated, e.g., fire breaks in forests, may also favor higher rates, with less frequent treatments.

In some situations it is desirable that the active uracil herbicide be released slowly from the carrier. Such compositions are particularly useful for application to gravel and cinder drive-ways and the like, where they release their herbicidal ingredients slowly over a long period of time and thus eliminate the necessity for frequent application.

Such compositions are made by incorporating the uracil into a solid or semi-solid matrix of a material such as Portland cement or calcium sulfate. The uracils will be present in these compositions in varying concentrations depending upon the ultimate use of the products. Generally, they will contain form 1% to 40%, by weight, of uracil. They can be prepared by any of the well-known techniques, such as granulating or pelletizing.

Herbicidal formulations can also be prepared containing a fungicide or bactericide. When such compositions are applied to the soil, the fungicidal or bactericidal ingredients retard the breakdown of the uracils by soil microorganisms and thus renders them stable over a longer period of time. The fungicides and bactericides which can be incorporated into these compositions can be any of the well-known products such as, for example, antibiotics such as penicillin, phenols, thio carbamates, and the like. The amount of microbiocide to be included in such compositions will naturally vary with their ultimate use. Generally, however, they will contain from 1% to 70% of a microbiocide.

The uracils of this invention can also be incorporated into paints, particularly marine paints, for application to surfaces where the growth of plants such as algae is undesirable. Such compositions are prepared by dissolving or suspending the uracil in a paint-compatible solvent. Uracils will be present in such compositions at concentrations of from 1% to 10%.

The uracils of this invention can also be dissolved in a suitable solvent or dispersed in a suitable carrier and impregnated into wooden objects such as construction timbers or railroad ties. When these objects are placed in or near the ground, the uracils slowly leach from them, thus preventing the growth of weeds in the nearby areas.

Such wooden objects, can also be floated on the surface of water in which undesirable aquatic growth is present. Again, the uracil is slowly leached from the wood and prevents growth of nearby aquatic weeds and algae for extended periods.

The concentration of uracil to be impregnated into any such wooden object will vary according to the nature of the wood and the type of weed to be controlled.

PREPARATION OF THE COMPOUNDS

Those uracils of Formula 1 where $R_1$ is alkyl, or alkenyl, as well as the uracil starting reactants for the reactions of Equations 10 to 12, can be prepared by methods heretofore described in the literature. For example, one method for the preparation of these compounds is illustrated by the following equations:

(5)

$$\text{CH}_2\!\!\diagdown\!\!\text{CHC}\!=\!\overset{\text{CH}_3}{\underset{\text{NH}_2}{\text{C}}}\!-\!\text{COOCH}_3 + \text{C}_5\text{H}_{11}\text{NCO} \longrightarrow$$

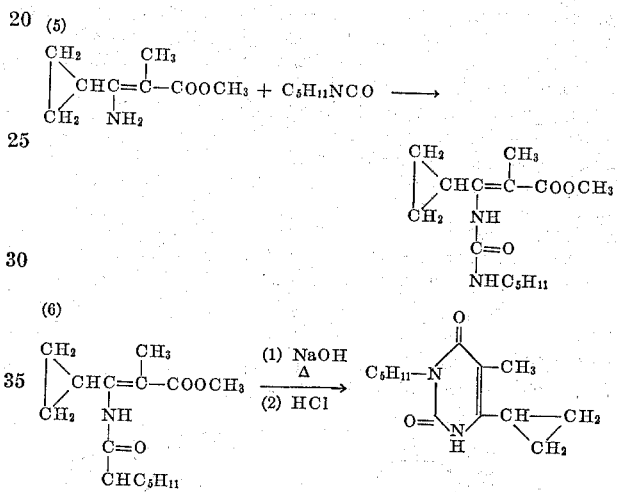

(6)

$$\text{CH}_2\!\!\diagdown\!\!\text{CHC}\!=\!\overset{\text{CH}_3}{\underset{\underset{\underset{\text{CHC}_5\text{H}_{11}}{\text{C=O}}}{\text{NH}}}{\text{C}}}\!-\!\text{COOCH}_3 \xrightarrow[\text{(2) HCl}]{\text{(1) NaOH}\;\Delta}$$

For more general details, note the publication by Behrend and Myer in Ann., 314, 219 (1901) and also Ber., 33, 622 (1900).

In the method of Equations 5 and 6, the esters of β-amino-α,β-unsaturated acids are first prepared by reacting the corresponding β-keto esters with aqueous ammonia [Conrad and Epstein, Ber., 20, 3054 (1887)]. These properly substituted β-amino-α,β-unsaturated esters are then reacted with an isocyanate in an inert solvent such as toluene or xylene, and heated for a short interval of time at reflux temperature.

The reaction mixture is chilled, filtered, and the filtrate distilled to remove the solvent. Generally, a viscous liquid residue remains which is crude 3-(3-substituted-ureido)-α,β-unsaturated ester. This can be reacted without further purification with an aqueous alcoholic alkaline solution at reflux temperature to bring about the desired uracil ring closure. At this point, the reaction is made slightly acidic with a strong acid such as hydrochloric acid and distilled to remove the alcohol. After the remaining aqueous solution has been chilled, the corresponding substituted uracil separates as an essentially pure solid.

Another method for preparing the uracil starting reactants is illustrated by the following equations:

(7)

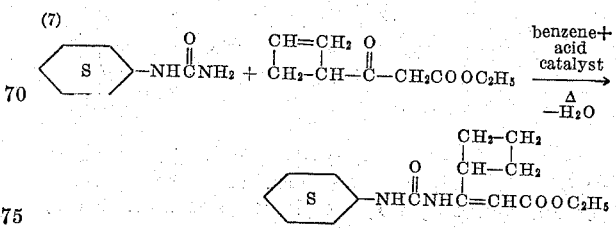

(7)

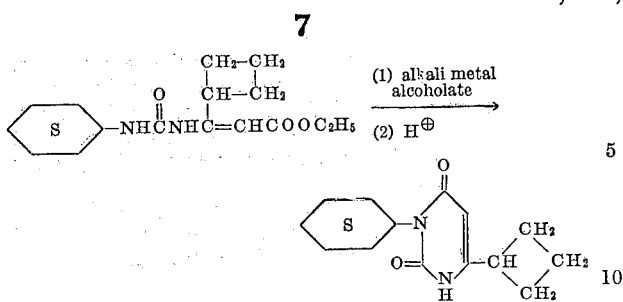

According to Equations 7 and 8, an appropriately substituted urea is reacted with a β-keto ester or an α-substituted β-keto ester substituted with such radicals as alkoxy, fluorine, alkyl, or alkenyl, and an acid catalyst, at reflux in a solvent from which water is removed continuously. After the water has all been removed, the solution is stripped and taken up in ethanol containing a base such as sodium methoxide. After a few minutes reflux, the solvent is removed, and the residual oil taken up in water and acidified, whereupon the desired product separates in crystalline form.

The product formed at the end of the first step, i.e., after the water has been removed, is a ureido compound of the type referred to in Equation 7. It can be isolated and purified if desired; however, this is not necessary or advantageous.

These ureido compounds referred to above are believed to exist in either or both of two tautomeric forms, as illustrated in the following equation:

(9)

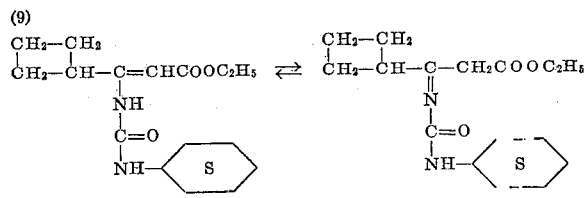

The uracils which are substituted in the 5-position with halogen, nitro, chloromethyl and hydroxymethyl groups can be prepared by an extrapolation of methods heretofore described in the literature for related compounds.

For example, the preparation of those compounds having a halogen substituent in the 5-position is illustrated by Equation 10. For more general details, see J. Amer. Chem. Soc., 61, 1015 (1939); Ann., 305, 314; Ann., 352, 242; and Ann., 441, 192.

(10)

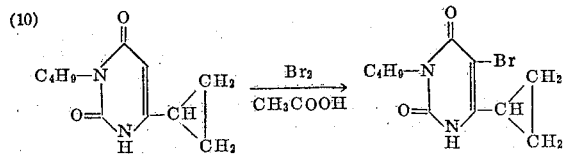

The 5-nitro uracils are prepared by direct nitration of uracils having no substituent in the 5-position, as illustrated in Equation 11. For a description of this method, see J. Am. Chem. Soc., 30, 1156 (1908).

(11)

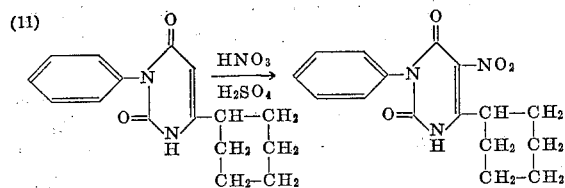

The reaction of formaldehyde with uracils not substituted in the 5-position gives uracils substituted in the 5-position with a hydroxymethyl group, as illustrated by Equation 12. For greater detail see Gazz. Chim. Ital., 79, 447 (1949).

(12)

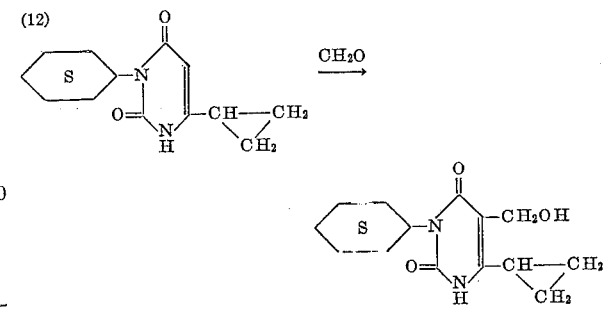

Thes 5-hydroxymethyl uracils can be easily reacted with alcohols, or thionylchloride, to give corresponding 5-alkoxymethyl, and 5-chloromethyl uracils.

The salts of the compounds of Formula 1 are prepared by conventional methods such as dissolving the free uracil in an aqueous or nonaqueous solution of at least an equimolar amount of a base or basic salt containing the desired cation. For example, a sodium salt can be prepared by dissolving the uracil in water containing an equimolar amount of sodium hydroxide. The salt can then be isolated from the solution by removal of the water. The uracil salts which are not soluble in water can be prepared by treating an aqueous solution of an alkali metal salt of the uracil with an aqueous solution of a water-soluble salt of the metal.

The quaternary ammonium salts of the compounds of Formula 1 are prepared by reacting the substituted uracil with an appropriate quaternary ammonium hydroxide. Since these hydroxides are generally available in solution, the reaction is most conveniently carried out in the same solvent. If the solvent-free salt is desired, it can be easily prepared by removing the solvent.

Alternatively, the quaternary ammonium salts of the uracils can be prepared in a dry inert solvent such as toluene or xylene. The appropriate quaternary ammonium halide is then added with stirring and, if necessary, mild heating. The sodium halide which forms is removed by filtration, leaving the quaternary ammonium salt of the uracil in solution. If desired, the solvent-free salt can be prepared by removing the solvent, preferably in vacuo.

The nitrogenous base-addition compounds of Formula 2 are prepared by mixing together equimolar quantities of an appropriate uracil and a nitrogenous base. The mixture is gradually heated, with stirring, until a clear melt is formed. On cooling, the addition compound crystallizes. This product can then be recrystallized from a solvent such as benzene, cyclohexane, nitromethane or acetonitrile.

It is sometimes advantageous to use an inert solvent medium to carry out the reaction. Such a solvent moderates the reaction by acting as a heat sink, and allows better control of the reaction, especially if it is being carried out on a large scale. Suitable inert solvents are benzene, cyclohexane, nitromethane, acetonitrile and dioxane.

When an inert solvent is used, the addition compounds are prepared by dissolving the amine in the solvent and then adding the uracil gradually, with stirring. Stirring is continued for from ten minutes to two hours. Mild heating may be necessary. Some addition compounds precipitate and can be removed by filtration. Other addition compounds are isolated by evaporating the solvent. The addition compounds prepared in this way are suitable for use without further purification, but can be purified by recrystallization if desired.

In some instances, the uracil and amine are highly soluble in the inert solvent, but the addition compound is not, and so it can be filtered off pure when the reaction is complete.

The complexes of Formula 3 are formed by comelting the uracil and phenol in a 1:1 to 2:1 (uracil:phenol) ratio. They can also be formed by codissolving the reactants, in the same ratio, in a nonpolar solvent such as nitromethane or a mixture of nitromethane and cyclohexane. Process conditions and isolation procedures are the same as those described above for the addition compounds.

HERBICIDAL COMPOSITIONS

The uracil compounds in Formulate 1 through 4 can be prepared for use by incorporating them with adjuvants.

The amount of herbicide in such prepartions can vary over a wide range according to need. Generally speaking, they will contain from about 0.5 to 95%, by weight of a uracil.

Powder and dust preparations can be made by mixing uracils of the invention with finely-divided solids such as talcs, natural clays, pyrophillite, diatomaceous earth; flours such as walnut shell, wheat, redwood, soya bean and cotton seed; or inorganic substances such as magnesium carbonate, calcium carbonate, calcium phosphate, sulfur and lime. These preparations are made by thoroughly blending the active ingredient and the solid. The particles in such preparations are preferably less than 50 microns in average diameter.

Water-soluble preparations can be prepared by mixing a uracil with an alkaline solubilizing agent. Solid bases having a pH of at least 9.5 in a 1% aqueous solution, such as sodium or potassium phosphates, silicates, carbonates, borates, oxides or hydroxides, are suitable. The preparations can contain from 0.5 to 80% active ingredient and from 5 to 99.5% of the solubilizing agent.

Granules and pellets can be made by mixing a finely-divided uracil with a suitable clay, moistening this mixture with from 15 to 20% by weight of water, and then extruding the mass through a suitable die under pressure. The extrusions are cut into pre-determined lengths and then dried. These pellets can be granulated if desired.

Granules or pellets can also be prepared by spraying a suspension or solution of a uracil onto the surface of a preformed granule of clay, vermiculite or other suitable granular material. If the uracil is in solution, it will penetrate into the pores of the granule and so will adhere without the aid of a binding agent. When the active material is insoluble in the liquid and is carried as a suspension, it is preferable that a binding agent such as goulac, dextrin, swollen starch, glue or polyvinyl alcohol be added. In either case, the granule is then dried and ready for use.

The uracils can also be prepared in non-aqueous liquids. Aliphatic and aromatic hydrocarbons, especially those derived from petroleum and having boiling points of from 125° C. to 400° C. are preferred. Hydrocarbons having lower boiling points should not be used because of their undesirable volatilization characteristics and inflammability. These liquid preparations are made by milling the components in a mill such as a pebble mill until the particles have average diameters of from 1 to 50 microns, preferably 5 to 20 microns.

The herbicidal preparations, whatever physical form they take, can also contain a surface-active agent. The surfactant renders the preparations readily dispersible in liquids and improves their action on waxy leaves and the like. For general application, surface-active agents are used in the preparations at concentrations of from about 1 to 10%, by weight. Levels of from 0.5 to 6 parts of surfactant for each part of uracil, however, give unusual and unexpected results. Preparations having these higher levels of surfactants show greater herbicidal effectiveness than can be expected from a consideration of activity of the components used separately.

The term "surface-active agent" is intended to include wetting agents, dispersing agents, suspending agents and emulsifying agents. Surface-active agents suitable for use are set forth in "Detergents and Emulsifiers . . . Up-to-Date," 1962, John W. McCutcheon, Inc., Morristown, N.J. Other surface-active agents which can be used in these preparations are listed in U.S. Patents 2,139,276; 2,412,510; 2,426,417; 2,655,447; and Bulletin E-607 of the Bureau of Entomology and Plant Quarantine of the U.S. Department of Agriculture.

The preparations can also optionally contain adhesives such as gelatin, blood albumin and such resins as rosin alkyd resins. These increase retention and tenacity of deposits following application.

The salts of the compounds of Formula I are especially advantageous for use as herbicides because they are soluble in water and can be applied as aqueous solutions.

With respect to the nitrogenous base-addition comfounds of Formula 2, it has been found that preparation with polar low-molecular weight amines, such as ethanolamines, propanolamines and butanolamines gives addition compounds soluble in water, especially when the amine is present in excess. Other amines, such as piperidine and octanolamines give addition compounds which are soluble in both water (with an excess of amine present) and hydrocarbon solvents. At the other end of the scale, amines such as dodecylamines, cocoaamines and tallowamines give the addition compounds high hydrocarbon solubility.

Thus, it is apparent that by properly selecting an amine and forming an addition compound with it, uracils of Formula 2 can be formulated as aqueous solutions, wettable powders, or as an oil-emulsifiable or oil-extendable formulations. In this way, the nitrogenous base-addition compounds give formulation and application advantages, while still maintaining the destribed herbicidal characteristics of the parent uracils.

FORMULATION WITH OTHER HERBICIDES

The herbicidal compositions of this invention can be formulated to contain two or more of the uracils. They can also be formulated to contaen other known herbicides in addition to the uracils to give compositions which have advantages over the individual components.

Among the known herbicides which can be combined with the uracils of Formula 1 are:

Substituted ureas 3-(3,4-dichlorophenyl)-1,1-dimethylurea
3-(4-chlorophenyl)-1,1-dimethylurea
3-phenyl-1,1-dimethylurea
3-(3,4-dichlorophenyl)-3-methoxy-1,1-dimethylurea
3-(4-chlorophenyl)-3-methoxy-1,1-dimethylurea
3-(3,4-dichlorophenyl)-1-n-butyl-1-methylurea
3-(3,4-dichlorophenyl)-1-methoxy-1-methylurea
3-(4-chlorophenyl)-1-methoxy-1-methylurea
3-(3,4-dichlorophenyl)-1,1,3-trimethylurea
3-(3,4-dichlorophenyl)-1,1-diethylurea
3-(p-chlorophenoxyphenyl)-1,1-dimethylurea These ureas can be mixed with the uracils of this invention in proportions of from 1:4 to 4:1, respectively the preferred ratio being 1:2 to 2:1.

Substituted triazines 2-chloro-4,6-bis(ethylamino)-s-triazine
2-chloro-4-ethylamino-6-isopropylamino-s-triazine
2-chloro-4,6-bis(methoxypropylamino)-s-triazine
2-methoxy-4,6-bis(isopropylamino)-s-triazine
2-diethylamino-4-isopropylacetamido-6-methoxy-s-triazine
2-isopropylamino-4-methoxyethylamino-6-methylmercapto-s-triazine
2-methylmercapto-4,6-bis(isopropylamino)-s-triazine
2-methylmercapto-4,6-bis(ethylamino)-s-triazine
2-methylmercapto-4-ethylamino-6-isopropylamino-s-triazine
2-methoxy-4,6-bis(ethylamino)-s-triazine 2-methoxy-4-ethylamino-6-isopropylamino-s-triazine
2-chloro-4,6-bis(isopropylamino)-s-triazine These triazines can be mixed with the uracils of this invention in proportions of from 1:4 to 4:1, respectively, the preferred ratio being 1:2 to 2:1.

Phenols

Dinitro-o-sec-butylphenol and its salts
Pentachlorophenol and its salts

These phenols can be mixed with the uracils of this invention in the proportions of 1:10 to 20:1, respectively, the preferred ratio being 1:5 to 5:1.

Carboxylic acids and derivatives

The following carboxylic acids and derivatives can be mixed with the uracils of this invention in the listed proportions:

(A)

2,3,6-trichlorobenzoic acid and its salts
2,3,5,6-tetrachlorobenzoic acid and its salts
2-methoxy-3,5,6-trichlorobenzoic acid and its salts
2-methoxy-3,6-dichlorobenzoic acid and its salts
3-amino-2,5-dichlorobenzoic acid and its salts
3-nitro-2,5-dichlorobenzoic acid and its salts
2-methyl-3,6-dichlorobenzoic acid and its salts
2,4-dichlorophenoxyacetic acid and its salts and esters
2,4,5-trichlorophenoxyacetic acid and its salts and esters
(2-methyl-4-chlorophenoxy)acetic acid and its salts and esters
2-(2,4,5-trichlorophenoxy)propionic acid and its salts and esters
2-(2,4,5-tricholorphenoxy)ethyl-2,2-dichloropropionate
4-(2,4-dichlorophenoxy)butyric acid and its salts and esters
4-(2-methyl-4-chlorophenoxy)butyric acid and its salts and esters
2,3,6-trichlorobenzyloxypropanol Mixed in a 1:16 to 8:1 ratio, preferably a 1:4 to 4:1 ratio.

(B)

2,6-dichlorobenzonitrile

Mixed in a 1:4 to 4:1 ratio, preferably a 1:3 to 3:1 ratio.

(C)

Trichloroacetic acid and its salts

Mixed in a 1:2 to 25:1 ratio, preferably a 1:1 to 8:1 ratio.

(D)

2,2-dichloropropionic acid and its salts

Mixed in a 1:4 to 8:1 ratio, preferably a 1:2 to 4:1 ratio.

(E)

N,N-di(n-propyl)thiolcarbamic acid, ethyl ester
N,N-di(n-propyl)thiolcarbamic acid, n-propyl ester
N-ethyl-N-(n-butyl)thiolcarbamic acid, ethyl ester
N-ethyl-N-(n-butyl)thiolcarbamic acid, n-propyl ester Mixed in a 1:2 to 24:1 ratio, preferably a 1:1 to 12:1 ratio.

(F)

N-phenylcarbamic acid, isopropyl ester
N-(m-chlorophenyl)carbamic acid, isopropyl ester
N-(m-chlorophenyl)carbamic acid, 4-chloro-2-butynyl ester Mixed in a 1:2 to 24:1 ratio, preferably a 1:1 to 12:1 ratio.

(G)

2,3,6-trichlorophenylacetic acid and its salts

Mixed in a 1:12 to 8:1 ratio, preferably a 1:4 to 4:1 ratio.

(H)

2-chloro-N,N-diallylacetamide
Maleic hydrazide

Mixed in a 1:2 to 10:1 ratio, preferably a 1:1 to 5:1 ratio.

Inorganic and mixed inorganic-organic salts

The following salts can be mixed with the uracils in the listed proportions:

(A)

Calcium propylarsonate
Disodium monomethylarsonate
Octyl-dodecylammoniummethylarsonate
Dimethylarsinic acid Mixed in a 1:4 to 4:1 ratio, preferably a 1:2 to 2:1 ratio.

(B)

Sodium arsenite

Mixed in a 1:5 to 40:1 ratio, preferably a 1:4 to 25:1 ratio.

(C)

Lead arsenate
Calcium arsenate

Mixed in a 150:1 to 600:1 ratio, preferably a 100:1 to 400:1 ratio.

(D)

Sodium tetraborate hydrated, granulated
Sodium metaborate
Sodium pentaborate
Polyborchlorate
Unrefined borate ore such as borascu Mixed in a 3:1 to 1500:1 ratio, preferably a 6:1 to 1000:1 ratio.

(E)

Ammonium thiocyanate

Mixed in a 1:10 to 20:1 ratio, preferably at 1:5 to 5:1 ratio.

(F)

Sodium chlorate

Mixed in a 1:1 to 40:1 ratio, preferably a 2:1 to 20:1 ratio.

(G)

Ammonium sulfamate

Mixed in a 1:1 to 100:1 ratio, preferably a 1:1 to 50:1 ratio.

Other organic herbicides

These organic herbicides can be mixed with the uracils in the listed proportions:

(A)

1,1'-ethylene-2,2'-dipyridylium cation
1,1'-ethylene-4,4'-dipyridylium cation

Mixed in a 1:20 to 16:1 ratio, preferably a 1:5 to 5:1 ratio.

(B)

3-amino-1,2,4-triazole

Mixed in a 1:20 to 20:1 ratio, preferably a 1:5 to 5:1 ratio.

(C)

3,6-endoxohexahydrophthalic acid

Mixed in a 1:3 to 20:1 ratio, preferably a 1:2 to 10:1 ratio.

(D)

Hexachloroacetone

Mixed in a 1:2 to 16:1 ratio, preferably at 1:1 to 8:1 ratio.

(E)

Diphenylacetonitrile
N,N-dimethyl-$\alpha$,$\alpha$-diphenylacetamide

N,N-di-n-propyl-2,6-dinitro-4-trifluoromethylaniline
N,N-di-n-propyl-2,6-dinitro-4-methylaniline Mixed in a 1:10 to 30:1 ratio, preferably a 1:5 to 20:1 ratio.

(F)

O-(2,4-dichlorophenyl)-O-methyl-isopropylphosphoramidothiate
2,3,5,6-tetrachloroterephthalic acid, dimethyl ester Mixed in a 1:4 to 20:1 ratio, preferably a 1:3 to 15:1 ratio.

(G)

2,4-dichloro-4'-nitrodiphenyl ether
2,3,5-trichloro-4-pyridinol
4-amino-3,5,6-trichloropicolinic acid Mixed in a 1:10 to 30:1 ratio, preferably a 1:5 to 20:1 ratio.

*Other substituted uracils*

These uracils can be mixed with other substituted uracils, in the propositions listed below.

(A)

3-cyclohexyl-6-methyluracil
3-cyclohexyl-6-ethyluracil
3-cyclohexyl-6-sec-butyluracil
3-norbornyl-6-methyluracil
3-cyclopentyl-6-methyluracil
3-cyclohexyl-6-isopropyluracil Mixed in a 1:4 to 4:1 ratio, preferably a 1:2 to 2:1 ratio.

(B)

3-cyclohexyl-5,6-trimethyleneuracil
3-sec-butyl-5,6-trimethyleneuracil
3-isopropyl-5,6-trimethyleneuracil
3-isopropyl-5,6-tetramethyleneuracil
3-isopropyl-5,6-pentamethyleneuracil Mixed in a 1:6 to 6:1 ratio, preferably a 1:4 to 4:1 ratio.

(C)

3-cyclohexyl-5-bromouracil
3-cyclohexyl-5-chlorouracil
3-isopropyl-5-bromouracil
3-sec-butyl-5-bromouracil
3-sec-butyl-5-chlorouracil Mixed in a 1:6 to 6:1 ratio, preferably a 1:2 to 2:1 ratio.

(D)

3-isopropyl-1-trichloromethylthio-5-bromo-6-methyluracil
3-cyclohexyl-1-trichloromethylthio-5-bromo-6-methyluracil
3-sec-butyl-1-acetyl-5-bromo-6-methyluracil
3-isopropyl-1-acetyl-5-bromo-6-methyluracil
3-isopropyl-1-trichloromethylthio-5-chloro-6-methyluracil Mixed in a 1:4 to 4:1 ratio, preferably a 1:2 to 2:1 ratio.

All of the foregoing ratios are weight ratios.

EXAMPLES

In order that the invention may be better understood, the following examples are given:

*Preparation of active ingredients*

EXAMPLE 1

*Preparation of 3-sec-butyl-6-cyclobutyluracil.*—Eighteen parts sec-butylurea, 60 parts benzene, 26.5 parts β-keto-β-cyclobutane propionic acid, ethyl ester and 1 part p-toluenesulfonic acid are heated under reflux for 24 hours using a Dean-Stark moisture trap. The reaction mixture is cooled and a solution of 5.3 parts sodium methoxide in 35 parts methanol is added. The mixture is heated under reflux 45 minutes, then cooled, and poured into 300 parts cold water and 100 parts ether. The organic layer is removed and the aqueous layer washed with ether.

When the aqueous layer is made acidic by addition of a strong acid, a white crystalline solid separates. This product is collected on a filter, washed with water, and dried. It melts at 166–167.5° C. After recrystallization from nitromethane it melts 170.5–171.5° C.

By substitution of a molecular equivalent of the appropriate β-cycloalkyl-β-ketopropionic ester the following uracils are prepared in the same way:

EXAMPLE 2

3-sec-butyl-6-cyclopentyluracil, M.P. 207.5–209° C.

EXAMPLE 3

3-sec-butyl-6-cyclopropyluracil, M.P. 170–171° C.

EXAMPLE 4

*Preparation of 5-bromo-3-sec-butyl-6-cyclobutyluracil.*—Eleven parts 3-sec-butyl-6-cyclobutyluracil, 4.2 parts anhydrous sodium acetate and 70 parts glacial acetic acid are stirred together at 30° C. while 8.0 parts bromine are added dropwise. One hour after the addition is complete, the solvent is evaporated under reduced pressure, and the residue is triturated with water. The white crystalline residue is collected on a filter, washed with water, and dried. The product melts at 156–158° C.

In the same way by substitution of a molecular equivalent of the appropriate unhalogenated uracil, the following uracils are prepared:

| Uracil Starting Reactant | Halogen | Uracil Product |
|---|---|---|
| 6-cyclopropyl-3-methyluracil | Br | 5-bromo-6-cyclopropyl-3-methyluracil. |
| 6-cyclopropyl-3-(2-dodecyl)uracil | Br | 5-bromo-6-cyclopropyl-3-(2-dodecyl)uracil. |
| 6-cycloheptyl-3-isopropyluracil | Br | 5-bromo-6-cycloheptyl-3-isopropyluracil. |
| 6-cyclopropyl-3-methoxymethyluracil | Br | 5-bromo-6-cyclopropyl-3-methoxymethyluracil. |
| 3-[2-(1-chlorooctyl)]-6-cyclopropyluracil | Cl | 5-chloro-3-[2-(1-chlorooctyl)]-6-cyclopropyluracil. |
| 6-cyclobutyl-3-(3-pyridyl)uracil | Cl | 5-chloro-5-cyclobutyl-3-(3-pyridyl)uracil. |
| 6-cyclopentyl-3-(1-naphthyl)uracil | Cl | 5-chloro-6-cyclopentyl-3-(1-naphthyl)uracil. |
| 3-cyclohexyl-6-cyclopropyluracil | Br | 5-bromo-3-cyclohexyl-6-cyclopropyluracil. |
| 3-(2-methylcyclohexyl)-6-cyclopropyluracil | Br | 5-bromo-3-(2-methylcyclohexyl)-6-cyclopropyluracil. |
| 3-tert-butyl-6-cyclopropyluracil | Br | 5-bromo-3-tert-butyl-6-cyclopropyluracil. |
| 6-cyclopropyl-3-(1-ethylpropyl)uracil | Br | 5-bromo-6-cyclopropyl-3-(1-ethylpropyl)uracil. |
| 3-tert-butyl-6-cyclopropyluracil | Cl | 5-chloro-3-tert-butyl-6-cyclopropyluracil. |
| 6-cyclopropyl-3-phenyluracil | Br | 5-bromo-6-cyclopropyl-3-phenyluracil. |
| 3-(3-chlorophenyl)-6-cyclopropyluracil | Cl | 5-chloro-3-(3-chlorophenyl)-6 cyclopropyluracil. |
| 3-sec-butyl-6-cyclopentyluracil | Br | 5-bromo-3-sec-butyl-6-cyclopentyluracil. |
| 3-sec-butyl-6-cyclopropyluracil | Br | 5-bromo-3-sec-butyl-6-cyclopropyluracil. |

EXAMPLE 5

*Preparation of 3-butyl-5-chloro-6-cyclopropyluracil.*—Eight parts of chlorine are added to a stirred solution of 20.8 parts of 3-butyl-6-methyluracil in 100 parts of glacial acetic acid. The temperature is maintained below 30° C. during this addition. The solution is stirred ½ hour longer at room temperature, then poured into ice water, whereupon a solid separates. This solid is collected by filtration and washed well with water to give crude 3-butyl-5-chloro-6-cyclopropyluracil. It is then recrystallized from a mixture of cyclohexane and ethyl acetate to give pure 3-butyl-5-chloro-6-cyclopropyluracil.

EXAMPLE 6

*Preparation of 5-bromo-3-butyl-6-cyclopropyluracil.*—Seventeen parts of bromine are added over a 20-minute period to a stirred solution of 20.8 parts of 3-butyl-6-cyclopropyluracil in 100 ml. of glacial acetic acid. The temperature is maintained below 30° C. during this addition. The solution is stirred at room temperature for an additional 1½ hours, then poured into a mixture of ice and water, with stirring. The white solid which separates is collected by filtration, washed well with water, and dried in a vacuum oven. The crude 5-bromo-3-butyl-6-cyclopropyluracil can be purified by recrystallization.

EXAMPLE 7

*Preparation of 3-allyl-6-cyclopropyl-5-methyluracil.*—A mixture of 19.6 parts by weight of allylurea, 37.4 parts by weight of ethyl 3-cyclopropyl-3-keto-2-methylpropionate, 0.5 part by weight of 85% orthophosphoric acid, and 200 parts by weight of benzene is heated at reflux. Water is collected in a Dean-Stark trap. After 24 hours, the solution is cooled, decanted and evaporated to a mixture of viscous oil and solid, which is taken up in 200 parts by weight of ethanol containing 10.6 parts by weight of sodium methoxide and heated at reflux for 10 minutes. Most of the ethanol is removed under reduced pressure and the residue is taken up in just sufficient water to dissolve it. Concentrated hydrochloric acid is added to lower the pH to 4 and the resulting white solid is collected by filtration. The solid is recrystallized from an ethanol-water mixture to give pure 3-allyl-6-cyclopropyl-5-methyluracil.

The following uracils are similarly prepared by substituting equivalent amounts of the ureas and equivalent amounts of the β-keto ethyl esters set forth in the table for the allylurea and ethyl 3-cyclopropyl-3-keto-2-methylpropionate:

EXAMPLE 8

*Preparation of 3-sec-butyl-6-cyclopentyl-5-nitrouracil.*—A solution of 40 parts by volume of fuming nitric acid and 40 parts by volume of fuming sulfuric acid (20% SO$_3$) is stirred at 25–30° C. while 20 parts by weight of 3-sec-butyl-6-cyclopentyluracil are added portion-wise over a 30-minute period. The solution is stirred an additional 30 minutes, then poured slowly into 4 volumes of a stirred ice-water mixture. The uracil separates out as a pale yellow solid. It is collected by filtration, washed well with water, and air dried. It may be recrystallized to give essentially 3-sec-butyl-6-cyclopentyl-5-nitrouracil.

The following 5-nitro substituted uracils can be similarly prepared by substituting equivalent amounts of the substituted uracil starting reactants set forth in the following table for 3-sec-butyl-6-cyclopentyluracil:

| Uracil Starting Reactant | 5-Nitrouracil Product |
|---|---|
| 3-tert-butyl-6-cyclopropyluracil | 3-tert-butyl-6-cyclopropyl-5-nitrouracil. |
| 3-cyclohexyl-6-cyclopropyluracil | 3-cyclohexyl-6-cyclopropyl-5-nitrouracil. |
| 3-(3-chloro-5-methylphenyl)-6-cyclopropyluracil | 3-(3-chloro-5-methylphenyl)-6-cyclopropyl-5-nitrouracil. |
| 6-cyclobutyl-3-(3-nitrophenyl)uracil | 6-cyclobutyl-5-nitro-3-)3-nitrophenyl)uracil. |
| 3-(3-chloro-5-nitrophenyl)-6-cyclopropyluracil | 3-(3-chloro-5-nitrophenyl)-6-cyclopropyl-5-nitrouracil. |
| 3-(3-chloro-4-methoxyphenyl)-6-cyclopropyluracil | 3-(3-chloro-4-methoxyphenyl)-6-cyclopropyl-5-nitrouracil. |
| 6-cyclopropyl-3-(3-trifluoromethylphenyl)uracil | 6-cyclopropyl-5-nitro-3-(3-trifluoromethylphenyl)uracil. |
| 6-cyclopropyl-3-tetrahydronaphthyl | 6-cyclopropyl-5-nitro-3-tetrahydronaphthyluracil. |
| 3,6-dicyclopropyluracil | 3,6-dicyclopropyl-5-nitrouracil. |
| 6-cyclopropyl-3-octahydro-1,4-5,8-dimethanonaphthyluracil. | 6-cyclopropyl-5-nitro-3-octahydro-1,4-5,8-dimethanonaphthyluracil. |

EXAMPLE 9

*Preparation of 3-cyclohexyl-6-cyclopropyl-5-hydroxymethyluracil.*—A mixture of 234 parts by weight of 3-cyclohexyl-6-cyclopropyluracil, 1400 parts by weight of water, 315 parts by weight of ethyl alcohol, 66 parts by weight of paraformaldehyde, and 20 parts by weight of barium hydroxide is heated until the components are completely dissolved. The solution is then stripped and the oil which remains is extracted with ether. This ether extract is dried with magnesium sulfate, filtered, and concentrated at reduced pressure to a slightly gummy solid. This solid is recrystallized from acetonitrile to give essentially pure 3-cyclohexyl-6-cyclopropyl-5-hydroxymethyluracil.

The following compounds are similarly prepared by substituting equivalent amounts of the designated uracil starting reactants for 3-cyclohexyl-6-cyclopropyluracil:

| Uracil Starting Reactant | Uracil Product |
|---|---|
| 3-sec-butyl-6-cyclopropyluracil | 3-sec-butyl-6-cyclopropyl-5-hydroxymethyluracil. |
| 3-tert-butyl-6-cyclopropyluracil | 3-tert-butyl-6-cyclopropyl-5-hydroxymethyluracil. |
| 3-cyclobutenyl-6-cyclopropyluracil | 3-cyclobutenyl-6-cyclopropyl-5-hydroxymethyluracil. |
| 6-cyclobutyl-3-indenyluracil | 6-cyclobutyl-5-hydroxymethyl-3-indenyluracil. |
| 6-cyclopropyl-3-furfuryluracil | 6-cyclopropyl-3-furfuryl-5-hydroxymethyluracil. |
| 6-cyclopropyl-3-octenyluracil | 6-cyclopropyl-5-hydroxymethyl-3-octenyluracil. |
| 6-cyclopropyl-3-propargyluracil | 6-cyclopropyl-5-hydroxymethyl-3-propargyluracil. |
| 6-allyl-3-octynyluracil | 6-allyl-5-hydroxymethyl-3-octynyluracil. |
| 3-cyclooctyl-6-cyclopropyluracil | 3-cyclooctyl-6-cyclopropyl-5-hydroxymethyluracil. |
| 3-cycloheptyl-6-cyclohexyluracil | 3-cycloheptyl-6-cyclohexyl-5-hydroxymethyluracil. |
| 6-cyclopropyl-3-decahydro-1,4-5,8-dimethanonaphthyluracil. | 6-cyclopropyl-3-decahydro-1,4-5,8-dimethanonaphthyl-5-hydroxymethyluracil. |

EXAMPLE 10

*Preparation of 3-isopropyl-5-chloromethyl-6-cyclohex-*

| β-Ketoester | Substituted Urea | Uracil Product |
|---|---|---|
| 3-cyclopropyl-3-keto-2-methylpropionate | 3-sec.butylurea | 3-sec-butyl-6-cyclopropyl-5-methyluracil. |
| Do | 3-tert-butylurea | 3-tert-butyl-6-cyclopropyl-5-methyluracil. |
| Do | (1-ethylpropyl)urea | 6-cyclopropyl-3-(1-ethylpropyl)-5-methyluracil. |
| 3-cycloheptyl-2-ethyl-3-keto propionate | 3-cyclohexylurea | 6-cycloheptyl-3-cyclohexyl-5-ethyluracil. |
| 3-cyclopropyl-2-fluoro-3-keto propionate | (3-bromophenyl)urea | 3-(3-bromophenyl)-6-cyclopropyl-5-fluorouracil. |
| 3-cyclopropyl-3-keto-2-propylpropionate | (4-ethoxyphenyl)urea | 6-cyclopropyl-3-(4-ethoxyphenyl)-5-propyluracil. |
| 3-cyclopropyl-3-keto-2-methoxypropionate | (2-fluorophenyl)urea | 6-cyclopropyl-3-(2-fluorophenyl)-5-methoxyuracil. |
| 3-cyclobutyl-3-keto-2-butoxypropionate | (3,5-dibromophenyl)urea | 6-cyclobutyl-3-(3,5-dibromophenyl)-5-butoxyuracil. |
| 3-cyclopentyl-2-ethoxy-3-ketopropionate | (2,4,5-trichlorophenyl)urea | 3-cyclopentyl-3-(2,4,5-trichlorophenyl)-5-ethoxyuracil. |
| 3-cyclohexyl-3-keto-2-propoxypropionate | (3-tolyl)urea | 6-cyclohexyl-3-(3-tolyl)-5-propoxyuracil. |
| 2-butyl-3-cyclopropyl-3-ketopropionate | (3,4-dimethylphenyl)urea | 5-butyl-6-cyclopropyl-3-(3,4-dimethylphenyl) uracil. |
| 3-allyl-2-methyl-3-ketopropionate | (4-sec-amylphenyl)urea | 6-allyl-3-(4-sec-amylphenyl)-5-methyluracil. |
| 3-keto-2-methyl-3-pentenylpropionate | (3-sec-butyl-5-ethylphenyl)urea | 3-(sec-butyl-5-ethylphenyl)-5-methyl-6-pentenyluracil. |
| 3-allyl-2-methylthio-3-ketopropionate | 3-(4-ethylnaphthyl)urea | 6-allyl-5-methylthio-3-[3-(4-ethylnaphthyl)]uracil. |
| 3-cyclohexyl-2-iodo-3-ketopropionate | 3-cyclopropylmethylurea | 6-cyclohexyl-5-iodo-3-cyclopropylmethyluracil. |
| 3-cyclopropyl-2-methyl-3-ketopropionate | 1-octahydro-1,4,5,8-dimethanonaphthylmethyl. | 6-cyclopropyl-5-methyl-3-(1-octahydro-1,4,5,8-dimethanonaphthylmethyl)uracil. |

*yluracil.*—A mixture of 22 parts by weight of 3-isopropyl-6-cyclohexyluracil and 38 parts by weight of chloromethylmethylether is heated in an autoclave under endogenous pressure at 100° C. for 25 hours. The material is cooled and the excess reagent evaporated under vacuum. The product is extracted from the residue with dry dioxane. The dioxane is then evaporated to dryness, leaving essentially pure 5-chloromethyl-3-isopropyl-6-cyclohexyluracil as a residue.

EXAMPLE 11

*Preparation of 6 - cyclopropyl-5-chloromethyl-3-isopropyluracil.*—To 452 parts of rapidly stirred thionyl chloride, maintained below 25° C. with an ice bath, are gradually added 224 parts of 6-cyclopropyl-5-hydroxymethyl-3-isopropyluracil. Caution should be used in carrying out this reaction because of the large amounts of acidic gases produced and the vigor of the reaction.

An efficient condenser is used to retain the thionyl chloride reactant, and a scrubber is used to wash away the gases produced.

When a complete solution has been obtained, it is distilled to dryness at reduced pressure at 50° C. The solid is triturated with 200 parts of a 1:1 mixture of 1,1,2-trichloroethane and heptane, and filtered.

The solid is then recrystallized from 600 parts of the same solvent, giving essentially pure 6-cyclopropyl-5-chloromethyl-3-isopropyluracil.

The following 5-halomethyluracils can be prepared by the method of Example 11 by substituting an appropriate thionyl halide and substituted uracil for the thionyl chloride and 5-hydroxymethyl-3-isopropyl-6-cyclopropyluracil of Example 11:

| Uracil | Thionyl Halide | Product |
|---|---|---|
| 3-(2-chlorocyclobutyl)-5-hydroxymethyl-6, cyclopentyluracil. | Thionyl bromide | 3-(2-chlorocyclobutyl)-5-bromomethyl-6-cyclopentyluracil. |

EXAMPLE 12

*Preparation of 6 - cyclopropyl-3-isopropyl-5-methoxymethyluracil.*—To a warm solution of 23.5 parts by weight of 5-chloromethyl-3-isopropyl-6-cyclopropyluracil in 150–200 parts by weight of methanol is added 5.4 parts by weight of sodium methoxide. The solution is heated to reflux for 15 minutes. The methanol is then evaporated, and the product extracted with ether. Evaporation of the ether yields 3-isopropyl-5-methoxymethyl-6-cyclopropyluracil in a crystalline state.

EXAMPLE 13

*Preparation of 3-isopropyl-5-methylthiomethyl-6-cycloheptyluracil.*—A suspension of 30.1 parts by weight of 5-chloromethyl-3-isopropyl-6-methyluracil and 7.0 parts by weight of sodium methylmercaptide in 100 parts by weight of tetrahydrofuran is heated to reflux for 45 minutes while gaseous methylmercaptan is added at a slow rate. The solvent is then evaporated and the product extracted from the residue with ether. Evaporation of the ether yields the desired 3-isopropyl-5-methylthiomethyl-6-cycloheptyluracil in a crystalline state.

EXAMPLE 14

*Preparation of 5 - chloro-6-methylthiomethyl-3-isopropyluracil.*—A mixture of 168 parts of 3-isopropyl-6-methyluracil, 100 parts of acetic acid and 650 parts of water is vigorously stirred as 147 parts of chlorine are gradually added as a gas. The temperature is maintained at 30° C. to 35° C. with a cooling bath.

The white slurry is stirred for an additional hour and 400 parts of concentrated hydrochloric acid are then added gradually with stirring. The slurry is heated at reflux for 5 hours, chilled to about 20° C. and filtered. The filter cake is resuspended in 500 parts of cold water and refiltered.

The dry filter cake is recrystallized from acetonitrile to give pure 5-chloro-6-chloromethyl-3-isopropyluracil.

A solution of 7 parts of sodium methylmercaptide in 250 parts of methanol is prepared. To this mixture is added 23.7 parts of 5-chloro-6-chloromethyl-3-isopropyluracil. The resulting mixture is boiled under reflux for 4 hours, cooled, and the solvent removed under vacuum. After washing the residue with water, the material which remains is nearly pure 5-chloro-3-isopropyl-6-methylthiomethyluracil.

By substituting an equivalent amount of sodium methoxide for the sodium methyl mercaptide one can prepare 5-chloro-3-isopropyl-6-methoxymethyluracil.

Similarly, the substitution of an equivalent amount of sodium n-butoxide for the sodium methyl mercaptide, as well as n-butanol for the methanol, leads to the formation of 5-chloro-6-n-butoxymethyl-3-isopropyluracil.

EXAMPLE 15

*Preparation of 3 - cyclohexyl - 5 - (2 - hydroxyethyl)-6-cyclopropyluracil.*—A mixture of 426 parts by weight of cyclohexylurea, 43.1 parts by weight of 2-keto-3-cyclopropylcarbonyltetrahydrofuran (which is prepared from 3-keto-3-cyclopropylpropionic acid, methyl ester, and ethylene oxide by known methods), 879 parts by weight of benzene, 1030 parts by weight of dioxane, and 40 parts by weight of 85% phosphoric acid is stirred at reflux temperature.

The water given off is removed by azeotropic distillation. When no more water is given off, the solution is cooled, decanted, and concentrated to dryness under reduced pressure. Three recrystallizations of the resulting solid from acetonitrile give 3-cyclopropyl-3-(3-cyclohexylureido)-2-(2-hydroxyethyl)acrylic acid, γ-lactone.

A mixture of 302 parts by weight of the 3-cyclopropyl-(3-cyclohexylureido)-2-(2-hydroxyethyl)acrylic acid, γ-lactone, 1580 parts by weight of absolute ethanol, and 130 parts by weight of sodium methoxide is refluxed for 15 minutes. It is then concentrated to dryness at reduced pressure, and the residue is dissolved in 1500 parts by weight of water.

This solution is cooled, acidified with hydrochloric acid to pH 5, and the resulting white precipitate, 3-cyclohexyl-5-(2-hydroxyethyl)-6-cyclopropyluracil, is filtered off, dried, and recrystallized from a mixture of ethanol and water.

EXAMPLE 16

*Preparation of 3-butyl-5-chloro-6-allyluracil, sodium salt.*—A solution of 4 parts of sodium hydroxide in 100 parts of water is treated with 24.6 parts of 3-butyl-5-chloro-6-methyluracil. Stirring and warming is employed to effect solution. The water is removed from the solution under reduced pressure, leaving 3-butyl-5-chloro-6-allyluracil, sodium salt, as a white solid.

The metal salts of the compounds prepared according to the foregoing examples can be prepared as in Example 16 by substituting equivalent amounts of other substituted uracils and other hydroxides for the 3-butyl-5-chloro-6-allyluracil and sodium hydroxide. The following list contains examples of salts prepared in this fashion:

3-sec-butyl-5-chloro-6-(2-butenyl)uracil, sodium salt
3-butyl-5-iodo-6-cyclobutyluracil, potassium salt
3-phenyl-5-methoxy-6-cyclopropyluracil, tetramethylammonium salt
3-(m-fluorophenyl)-5-bromo-6-methylthiouracil, ½ magnesium salt 3-(3a,4,5,6,7,7a-hexahydro-4,7-methano-5-indanyl)-
5-bromo-6-allyluracil, sodium salt

EXAMPLE 17

*Preparation of 1:1 complex of 5-bromo-3-isopropyl-6-cyclobutyluracil and pentachlorophenol.*—A mixture of 29.1 parts of 5-bromo-3-isopropyl-6-cyclobutyluracil, 266 parts of pentachlorophenol and 1250 parts of cyclohexane is stirred at reflux as 50 parts of nitromethane are gradually added. The physical appearance of the solid changes rapidly. When no further change is noticed, the mixture is chilled and the solid product is filtered off and recrystallized from nitromethane.

The following complexes can be prepared in a similar fashion by substituting equivalent amounts of the proper phenol and uracil for the 5-bromo-3-isopropyl-6-cyclobutyluracil and pentachlorophenol:

1:1 complex m-methylphenol and 5-bromo-3-sec-butyl-6-methylthiouracil
1:1 complex p-nitrophenol and 5-bromo-3-sec-butyl-6-butoxy-methyluracil
1:1 complex phenol and 3-isopropyl-5-methyl-6-cyclopentyluracil

EXAMPLE 18

*Preparation of the ethanolamine addition compound of 5-bromo-3-isopropyl-6-cyclobutyluracil.*—A solution is prepared by mixing together 283 parts of 5-bromo-3-isopropyl-6-methyluracil, 392 parts of acetonitrile and 61 parts of ethanolamine. The solvent is distilled off at reduced pressure and the oil which remains gradually solidifies. The molar addition compound is recrystallized from nitromethane.

EXAMPLE 19

*Preparation of the octylamine addition compound of 5-bromo-3-isopropyl-6-methoxymethyluracil.*—A mixture containing one part of octylamine and one part of 5-bromo-3-isopropyl-6-methyluracil is stirred and maintained at about 40° C. with gentle heating until the ingredients are in complete solution. The solution is cooled and the hard granular crystals which form are filtered off and washed three times with small portions of cold benzene. The resulting product is a molar addition compound.

Formulations
  Liquid compositions
    Aqueous solutions

EXAMPLE 20

| | Percent |
|---|---|
| 3-cyclohexyl-6-cyclopropyluracil, sodium salt | 20 |
| Sodium lauryl sulfate | 2 |
| Water | 78 |

The solution is prepared by dissolving the two soluble salts in the water, with agitation. The solution is suitable for quick dilution to desired spray levels.

Other soluble salts suitable for preparation of water concentrates are 3-sec-butyl-5-bromo-6-cyclopropyluracil, sodium salt
3-isopropyl - 5 - chloro - 6 - cyclopropyluracil, tetrabutylammonium salt This aqueous solution is used for post-emergence weed control. A concentration of 1.0 pound of active ingredient per acre in 30 gallons of water gives excellent control of crab grass, pigweed, velvet weed, and flower-of-an-hour.

At concentrations of 10 to 20 pounds per acre in 80 gallons of water, this composition gives excellent control of a wide variety of annual and broadleaf weeds growing in railroad yards on railroad ballast.

EXAMPLE 21

| | Percent |
|---|---|
| 5-bromo-6-cyclopropyl-3-isopropyluracil | 50 |
| Ethanolamine | 50 |

The components are mixed together at room temperature until a clear solution is formed. This solution is infinitely extendable with water and can be diluted to any concentration.

Ten pounds of this formulation are mixed with 60 gallons of water in a spray tank. Ten pounds of trimethylnonyl ether of polyethylene glycol, are added. Only slight agitation is required for complete mixing.

Sixty gallons of this solution are applied to an acre of roadside. Excellent initial kill of foliage and residual weed control is obtained. Such species as wild oats, cheatgrass, crab grass, foxtails, ryegrass, volunteer small grain and wild mustard are controlled.

Oil formulations

EXAMPLE 22

| | Percent |
|---|---|
| 3-cyclohexyl-5-bromo-6-cyclopropyluracil | 25 |
| Blend of polyalcohol carboxylic esters and oil-soluble petroleum sulfonates | 6 |
| Diesel oil | 69 |

These components are mixed together and milled in a roller mill, pebble mill, or sand mill until the particles of the active component are substantially all below 10 microns in size. The resulting suspension can be emulsified in water or diluted further with weed oils for spray application.

This formulation is diluted with 80 gallons of Lion Herbicidal Oil—No. 6 and applied at 10 to 20 pounds of active ingredient per acre for the control of weeds such as morning glory, chickweed, pigweed, lamb's quarter, yarrow, ragweed, wild carrot, quack grass, witch grass, crab grass, and oak and maple seedlings growing along railroad rights-of-way. Excellent control is obtained.

EXAMPLE 23

Ten pounds of 3-sec-butyl-5-bromo-6-cyclopentyluracil as an 80% wettable powder and 2 pounds of 4,6-dinitro-ortho-secondary butylphenol in 4 gallons of oil are blanded as a tank mix and applied at 12 pounds of active herbicide per acre in 100 gallons of water to weeds growing along fence rows. Quick kill of annual and perennial broadleaf and grass weeds is obtained, with excellent residual weed control.

EXAMPLE 24

| | Percent |
|---|---|
| 3-sec-butyl-5-chloro-6-cyclopropyluracil, Na salt | 25 |
| Granular 8–15 mesh attapulgate clay | 75 |

A granular composition is prepared by dissolving the active ingredient in water and spraying this solution on the attapulgite granules while they are tumbled. The resulting granules are then dried.

The granules are applied by hand for "spot treatment" of undesirable bunch grasses growing in agricultural areas. An application of 20 to 30 pounds of active ingredient per acre gives good control of Dallis and vasey grass.

EXAMPLE 25

| | Percent |
|---|---|
| 3-tert-butyl-5-chloro-6-cyclopropyluracil | 3.3 |
| 3-phenyl-1,1-dimethylurea | 6.7 |
| California Ca, Mg sub-bentonite | 75.0 |
| Anhydrous sodium sulfate | 15.0 |

This composition is blended, micropulverized, pug-milled with about 20% water, moist-granulated and then dried. It is then screened to give 15–30 mesh granules.

Applied at 15 pounds of active ingredient per acre, these granules give excellent control of such weeds as bitterweed, partridge pea, beggar's-lice, ragweed, crab grass, cheat, and common lespedeza, growing along guard rails and around sign boards.

EXAMPLE 26

| | Percent |
|---|---|
| 3-isopropyl-5-chloro-6-methoxymethyluracil | 2.0 |
| Sodium chlorate | 38.4 |
| Sodium borate | 59.6 |

A mixture of the crystalline chlorate and borate is placed in a blender. Finely ground uracil is slurried in water and sprayed on the chlorate-borate mixture while it is blended.

This formulation is effective against grass and broadleaf weed infestations, and can be easily applied on railroad rights-of-way. An application of 400 pounds per acre of these granules gives outstanding control of little bluestem, broomsedge, foxtail, crab grass, ragweed, pigweed, henbit, and knotweed.

*Soluble powders*

EXAMPLE 27

This formulation is prepared by blending, micropulverizing and then reblending the following ingredients:

| | Percent |
|---|---|
| 3-isopropyl-5-bromo-6-cyclopentyluracil | 20 |
| Sodium metaborate | 40 |
| Dioctylsodium sulfosuccinate | 30 |
| Sodium lignin sulfonate | 2 |
| Finely-divided synthetic silica | 8 |

The active ingredient in this formulation is soluble in water when the formulation is added to water to make a 4% concentration.

One hundred gallons of a 4% concentration of this formulation are applied to an area of one acre in a sawmill yard infested with annual weeds. Outstanding control of crab grass, foxtail, ragweed, barnyard grass, bromegrass and pigweed is obtained.

*Wettable powders*

EXAMPLE 28

| | Percent |
|---|---|
| 3-isopropyl-5-bromo-6-cyclohexyluracil | 40 |
| 3-(3,4-dichlorophenyl)-1,1-dimethylurea | 40 |
| Alkyl aryl polyether alcohol 40%, extended on a silica powder | 4 |
| Substituted acetylenic glycol | 1 |
| Partially desulfonated sodium lignin sulfonate | 2 |
| Kaolin clay | 10 |
| Synthetic fine silica | 3 |

This formulation is applied in 100 gallons of water, at 20 pounds of active ingredient per acre, for the control of finger grass, foxtail, lovegrass, nutgrass, vasey grass, broomsedge, sand spur, goldenrod, ragweed, beggar-tick, and spurge growing around oil tanks. The formulation gives a good rapid kill of foliage and has long-lasting residual activity in the soil.

Two pounds (active) of this formulation is dispersed in 40 gallons of water. When applied premergence or early post-emergence to the tender weeds, excellent control of annual grasses and broadleaf weeds growing in sugar cane is obtained. A post-emergence spray, directed under the cane plants, gives good control of rice grass, crab grass, goosegrass, seedling Johnson grass, Ageratum, pigweed, lamb's quarters and velvet leaf.

The invention claimed is:

1. A method for the control of undesirable vegetation, said method comprising applying to a locus to be protected a herbicidally effective amount of a compound of the formula

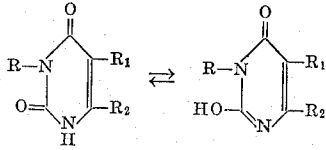

where
R is selected from the group consisting of
  alkyl of 1 through 10 carbon atoms,
  substituted alkyl of 1 through 8 carbon atoms, wherein said substitutent is selected from the group consisting of bromine, chlorine, hydroxy, alkoxy, alkoxycarbonyl, and cyano,
  aryl of 5 through 10 carbon atoms,
  substituted phenyl, wherein said substituent is selected from the group consisting of chlorine, bromine, fluorine, alkoxy of 1 through 5 carbon atoms, alkyl of 1 through 6 carbon atoms, nitro, trifluoromethyl, 1,2-tetramethylene, and 1,2-trimethylenylene,
  aralkyl of 5 through 13 carbon atoms,
  substituted aralkyl of 5 through 13 carbon atoms, wherein said substitutent is selected from the group consisting of chlorine, nitro, alkyl, and alkoxy,
  tetrahydronaphthylalkyl,
  alkenyl of 3 through 8 carbon atoms,
  alkynyl of 3 through 8 carbon atoms,
  cycloalkyl of 3 through 12 carbon atoms,
  substituted cycloalkyl of 3 through 12 carbon atoms, wherein said substitutent is selected from the group consisting of bromine, chlorine, methoxy, and alkyl,
  cycloalkenyl of 4 through 12 carbon atoms, substituted cycloalkenyl of 4 through 12 carbon atoms, wherein said substituent is selected from the group consisting of bromine, chlorine, methoxy, and alkyl,
  cycloalkyl alkyl of 4 through 13 carbon atoms,
  cycloalkenyl alkyl of 5 through 13 carbon atoms,
  (substituted cycloalkyl)alkyl of 5 through 14 carbon atoms, wherein said substituent is selected from the group consisting of bromine, chlorine, methoxy, and alkyl, and
  (substituted cycloalkenyl)alkyl of 5 through 14 carbon atoms, wherein said substituent is selected from the group consisting of bromine, chlorine, methoxy, and alkyl;
$R_1$ is selected from the group consisting of
  chlorine, fluorine, bromine, iodine, methyl, ethyl, propyl, butyl, methoxy, ethoxy, propoxy, butoxy, nitro, alkoxymethyl of 2 through 6 carbon atoms, hydroxy alkyl of 1 through 2 carbon atoms, alkylthio containing 1 through 4 carbon atoms, bromomethyl, fluoromethyl, and chloromethyl;
$R_2$ is selected from the group consisting of
  cycloalkyl of 3 through 7 carbon atoms, alkenyl of 3 through 5 carbon atoms, alkylthio of 1 through 4 carbon atoms, alkylthiomethyl of 2 through 3 carbon atoms, and alkoxymethyl of 2 through 5 carbon atoms;
with the further proviso for said formula that when $R_2$ is cycloalkyl of 3 through 7 carbon atoms, $R_1$ can be hydrogen.

2. A method for the control of undesirable vegetation, said method comprising applying to a locus to be protected a herbicidally effective amount of a compound of the formula

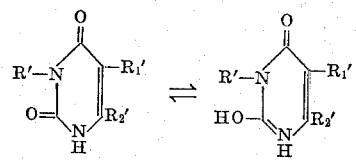

where
R' is selected from the group consisting of
  alkyl of 2 through 8 carbon atoms,
  substituted alkyl of 2 through 8 carbon atoms wherein said substituent is selected from the group consisting of bromine, chlorine, hydroxy, alkoxy, alkoxycarbonyl, and cyano, phenyl, substituted phenyl, wherein said substituent is selected from the group consisting of chlorine, bromine, fluorine, alkoxy of 1 through 5 carbon atoms, alkyl of 1 through 6 carbon atoms, nitro, trifluoromethyl, 1,2-tetramethylene, and 1,2-trimethylenylene, aralkyl of 6 through 10 carbon atoms, substituted aralkyl of 6 through 10 carbon atoms, wherein said substituent is selected from the group consisting of chlorine, nitro, alkyl, and alkoxy, cycloalkyl of 3 through 8 carbon atoms, cycloalkenyl of 5 through 8 carbon atoms, cycloalkyl alkyl of 4 through 9 carbon atoms, or (substituted cycloalkyl)alkyl of 5 through 10 carbon atoms, wherein said substituent is selected from the group consisting of bromine, chlorine, methoxy, and alkyl;

$R_1'$ is selected from the group consisting of chlorine, bromine, iodine, methyl, hydroxymethyl, methoxymethyl and nitro; and $R_2'$ is selected from the group consisting of alkoxymethyl of 2 through 3 carbon atoms, cycloalkyl of 3 through 6 carbon atoms, and alkenyl of 3 through 4 carbon atoms.

References Cited
UNITED STATES PATENTS 3,235,357  2/1966  Loux _____ 260—260

JAMES O. THOMAS, JR., *Primary Examiner.*

LEWIS GOTTS, *Examiner.*